US007740166B2

(12) United States Patent
Takeuchi

(10) Patent No.: US 7,740,166 B2
(45) Date of Patent: Jun. 22, 2010

(54) PUSH SWITCH

(75) Inventor: Masatsugu Takeuchi, Okayama (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 11/696,779

(22) Filed: Apr. 5, 2007

(65) Prior Publication Data

US 2007/0235312 A1 Oct. 11, 2007

(30) Foreign Application Priority Data

Apr. 6, 2006 (JP) ............................ 2006-104844

(51) Int. Cl.
*G06F 17/00* (2006.01)

(52) U.S. Cl. ........................ 235/375; 200/520; 200/406

(58) Field of Classification Search ................. 235/375; 200/406, 520, 534, 524

See application file for complete search history.

(56) References Cited

U.S. PATENT DOCUMENTS 5,199,557 A 4/1993 Brandt et al.
5,772,010 A * 6/1998 Watanabe et al. ........... 200/406
2003/0213686 A1* 11/2003 Takeuchi et al. ............ 200/406

FOREIGN PATENT DOCUMENTS

JP 9-147666 A 6/1997

* cited by examiner

*Primary Examiner*—Edwyn Labaze
(74) *Attorney, Agent, or Firm*—RatnerPrestia

(57) ABSTRACT

A push switch includes a lower case having a recess therein, an inner and outer fixed contacts exposing from a bottom of the recess, a movable contact accommodated in the recess, an upper case attached to the lower case, an elastic operation body for sealing the recess of the lower case, and a push button provided on the elastic operation body. The movable contact has a dome shape having a concave surface facing the inner fixed contact by a distance, a convex surface opposite to the concave surface, and an outer peripheral end placed on the outer fixed contact. The upper case has a through-hole located above the recess of the lower case. The has a lower surface contacting the convex surface of the movable contact, an upper surface opposite to the lower surface, and an outer edge held between the upper case and the lower case while being compressed. The push button is inserted into the through-hole of the upper case movably. This push switch prevents dust from entering in the switch and operates reliably.

4 Claims, 8 Drawing Sheets

PUSH SWITCH

FIELD OF THE INVENTION

The present invention relates to a push switch.

BACKGROUND OF THE INVENTION

A push switch providing a light click feeling has been often used for an input/operation section of various electronic devices. A push switch is demanded to be activated with a light operation force to reduce a burden to fingers and to have a long operation stroke particularly for use as an input device, such as a mouse, of a personal computer.

FIGS. 6 and 7 are a cross-sectional view and an exploded perspective view of conventional push switch 501 disclosed in Japanese Patent Laid-Open Publication No. 9-147666. Lower case 1 has a box shape and is made of insulating resin and opens at its upper side. Lower case 1 has an recess having a bottom. Inner fixed contact 2A and outer fixed contacts 3A and 3B are exposed from the bottom surface and are fixed by an insert molding. Inner fixed contact 2A is fixed at the center of the bottom. Outer fixed contacts 3A and 3B are located at an outer periphery of the bottom. Inner fixed contact 2A is located at the midpoint between outer fixed contacts 3A and 3B. Outer fixed contacts 3A and 3B are electrically independent from inner fixed contact 2. Inner fixed contact 2A connected to terminal 2 for connection to an external circuit extends outwardly from side wall 1A of lower case 1. Outer fixed contacts 3A and 3B connected to terminal 3 for connection to an external circuit extend outwardly from side wall 1A.

Movable contact 4 is made of thin plate if conductive and elastic metal and is shaped to have a circular dome shape having an opening at its lower part. Edges of the outer peripheral end of movable contact 4 are located on outer fixed contacts 3A and 3B, respectively. The deepest point of the dome shape of the lower surface of movable contact 4 faces inner fixed contact 2A by a distance.

Elastic operation body 5 is located on movable contact 4. Elastic operation body 5 has flange section 5A having a circular disk shape, upper projection 5B projecting from the center of an upper surface of flange section 5A, lower projection 5C projecting from the center of an upper surface of flange section 5A, and tubular section 5D protruding from an outer peripheral edge of flange section 5A. Lower projection 5C has a lower end contacting an upper surface of the top of the dome shape of movable contact 4.

Push button 6 is made of insulating resin and has columnar section 6A and flange 6B provided at the lower part of columnar section 6A. Columnar section 6A has a lower surface having recess 6C provided at the center thereof. Push button 6 is provided on elastic operation body 5, such that the upper part of upper projection 5B of elastic operation body 5 is inserted in recess 6C.

Upper case 7 made of insulating resin is attached to lower case 1 by being caulked with projection 1B of lower case 1 to cover the recess of lower case 1. Upper case 7 has through-hole 7A.

Columnar section 6A of push button 6 is inserted into through-hole 7A of upper case 7 and is supported movably in up-and-down directions. The upper part of columnar section 6A protrudes from through-hole 7A in an upward direction. An upper surface of flange 6B of push button 6 contacts a lower surface of upper case 7. When push button 6 is not activated, push button 6 has recess 6C slightly push upper projection 5B of elastic operation body 5. Elastic operation body 5 urges push button 6 towards upper case 7, thereby preventing push button 6 from wobbling.

An operation of push switch 501 will be described below. FIG. 8 is a cross-sectional view of push switch 501 which is activated.

When columnar section 6A of push button 6 protruding from through-hole 7A of upper case 7 is depressed, push button 6 moves downward while being supported by through-hole 7A. When push button 6 moves, a pressing force is applied to upper projection 5B of elastic operation body 5 inserted into recess 6C of push button 6. The force pressurizes and compresses elastic operation body 5 in its longitudinal direction provided from upper projection 5B to lower projection 5C, accordingly applying a pressure via elastic operation body 5 to the top of the dome shape of movable contact 4 contacting lower projection 5C. When the pressure exceeds a predetermined value, the top of the dome shape of movable contact 4 is elastically inverted to have the lower surface of movable contact 4 contact inner fixed contact 2A with a click feeling, and connects outer fixed contacts 3A and 3B with inner fixed contact 2A via movable contact 4, thereby turning on push switch 501.

When movable contact 4 contacts inner fixed contact 2A, push button can be further pushed with a further pressing force downwardly. In this situation, outer fixed contacts 3A and 3B are electrically connected with inner fixed contact 2A via movable contact 4, as shown in FIG. 8, and upper projection 5B and lower projection 5C of elastic operation body 5 are compressed further elastically.

When the pressing force applied to push button 6 is removed, the pressure applied to elastic operation body 5 is canceled. Upper projection 5B and lower projection 5C accordingly return to have their original shapes and push up push button 6. Then, movable contact 4 is inverted to return to have its original dome shape. Then, movable contact 4 is removed away from inner fixed contact 2A, as shown in FIG. 6, to electrically disconnect outer fixed contacts 3A and 3B from inner fixed contact 2A, thereby turning off push switch 501.

In order to allow push button 6 to be movable, narrow gap 501A must be provided between through-hole 7A of upper case 7 and columnar section 6A of push button 6. When push switch 501 is activated, the upper surface of flange 6B of push button 6 is removed from the lower surface of upper case 7, as shown in FIG. 8, and an inside of the recess of lower case 1 communicates with the outside of push switch 501 via gap 501A. This may allow dust existing the outside of switch 501 to enter into the recess of lower case 1 through gap 501A during the activation of push switch 501. The dust would prevent movable contact 4 from contacting the fixed contacts, thereby preventing push switch 501 from operating appropriately.

SUMMARY OF THE INVENTION

A push switch includes a lower case having a recess therein, an inner and outer fixed contacts exposing from a bottom of the recess, a movable contact accommodated in the recess, an upper case attached to the lower case, an elastic operation body for sealing the recess of the lower case, and a push button provided on the elastic operation body. The movable contact has a dome shape having a concave surface facing the inner fixed contact by a distance, a convex surface opposite to the concave surface, and an outer peripheral end placed on the outer fixed contact. The upper case has a through-hole located above the recess of the lower case. The has a lower surface contacting the convex surface of the movable contact, an upper surface opposite to the lower surface, and an outer edge held between the upper case and the lower case while being compressed. The push button is inserted into the through-hole of the upper case movably.

This push switch prevents dust from entering in the switch and operates reliably.

DETAILED DESCRIPTION OF THE PREFERRED EMBODIMENT

Figure 1:
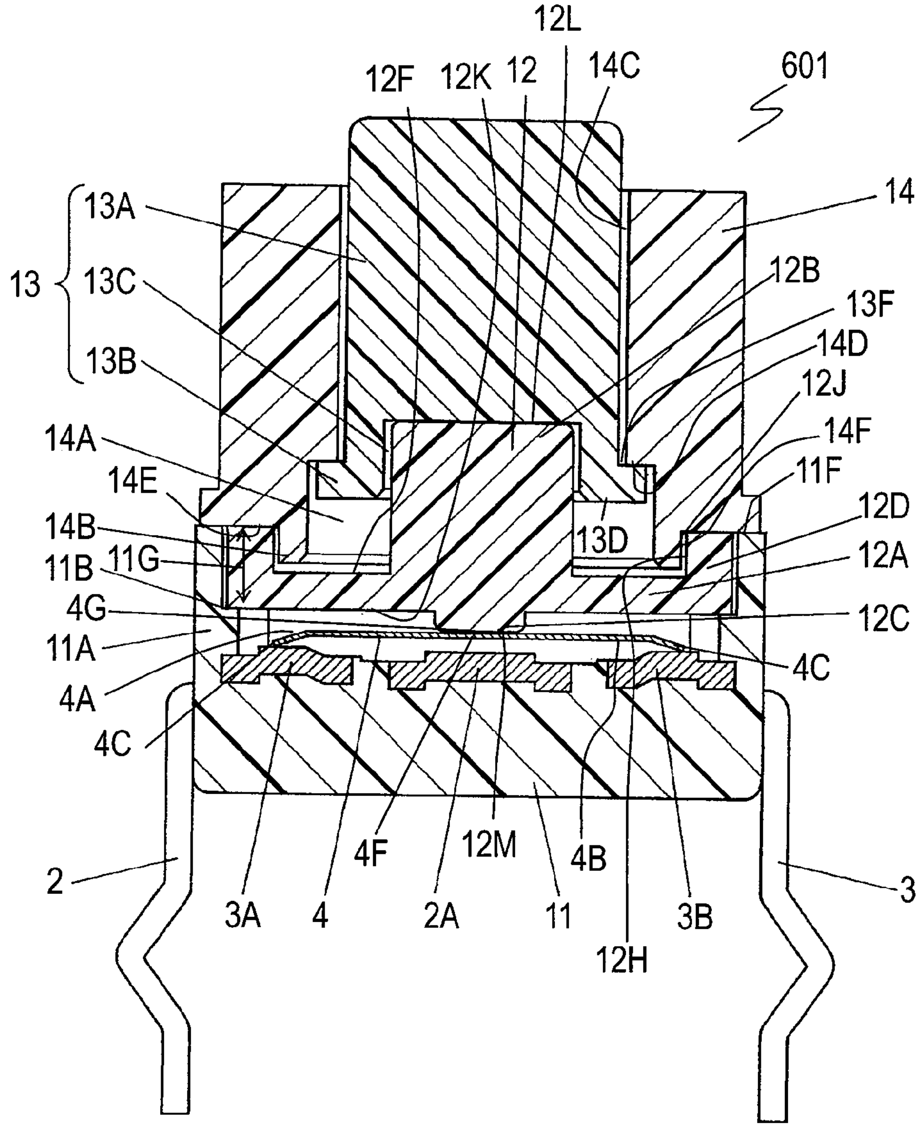
FIG. 1 is a cross-sectional view of a push switch according to an exemplary embodiment of the present invention.
Figure 2:
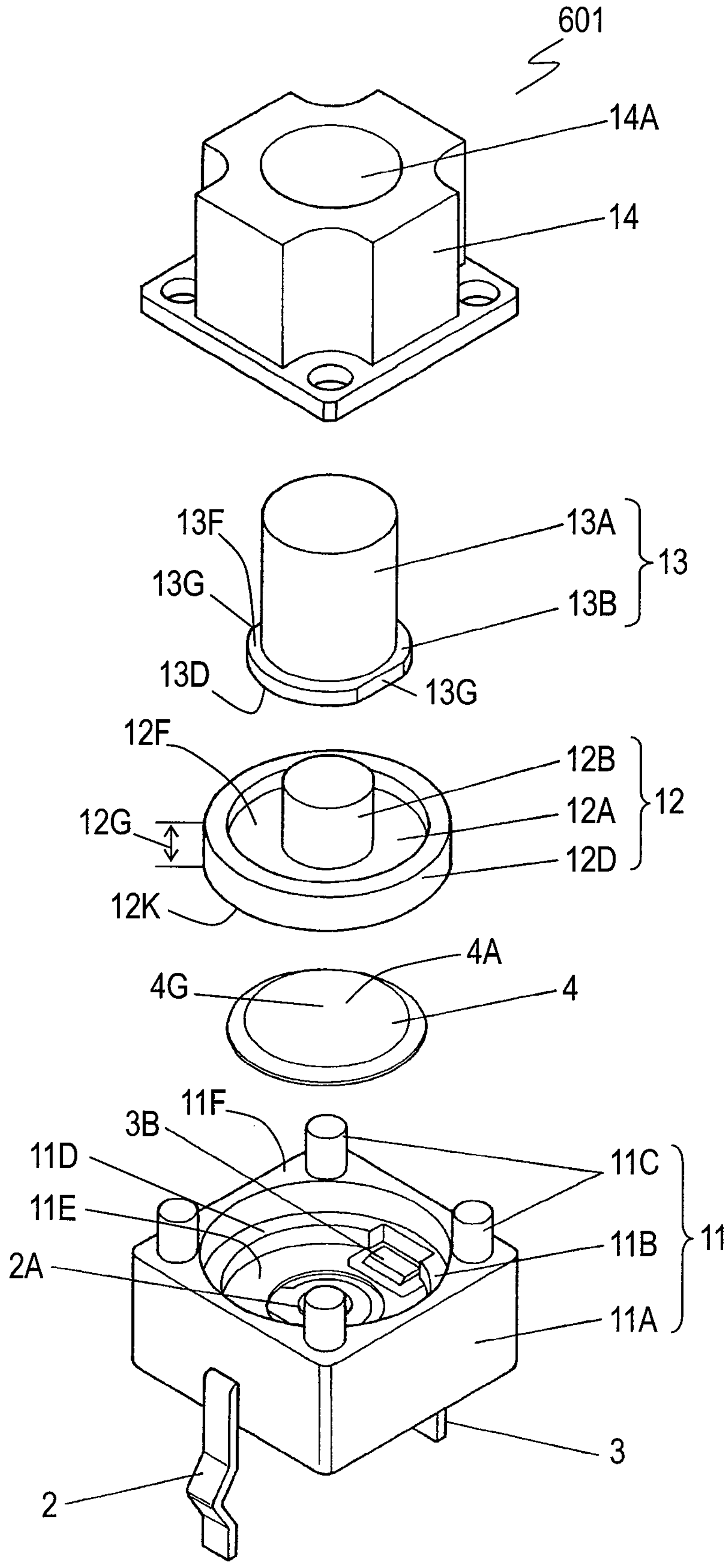
FIG. 2 is an exploded perspective view of the push switch according to the embodiment.

FIGS. 1 and 2 are a cross-sectional view and an exploded perspective view of push switch 601 according to an exemplary embodiment of the present invention, respectively.

Lower case 11 has of a box shape and is made of insulating resin. Lower case 11 has recess 11D opening upward. Inner fixed contact 2A and outer fixed contacts 3A and 3B expose from bottom 11E of recess 11D and are provided by insert molding. Inner fixed contact 2A is provided at the center of bottom 11E. Outer fixed contacts 3A and 3B are provided at an outer periphery of bottom 11E. Inner fixed contact 2A is located at the midpoint between outer fixed contacts 3A and 3B. Terminal 2 for connection to outside is connected to inner fixed contact 2A and extends from side wall 11A of lower case 11 to the outside of the case. Terminal 3 for connection to outside is connected to outer fixed contacts 3A and 3B and extends from side wall 11A of lower case 11 to the outside of the case. Recess 11D of lower case 11 is surrounded by upper surface 11F of side wall 11A contacting lower surface 14E of upper case 14.

Movable contact 4 is made of an elastic thin metal plate having a dome shape having convex surface 4A, concave surface 4B opposite to convex surface 4A, and outer peripheral end 4C. Outer peripheral end 4C is placed on fixed contacts 3A and 3B. Deepest point 4F of concave surface 4B faces inner fixed contact 2A by a distance between them.

Elastic operation body 12 made of elastic insulating material, such as silicon rubber, has flange section 12A having a circular disk shape, upper projection 12B protruding from the center of upper surface 12F of flange section 12A, lower projection 12C protruding from the center of lower surface 12K flange section 12A, and tubular section 12D which is provided at an entire outer edge of flange section 12A and which protrudes from upper surface 12F. Lower surface 12M of lower projection 12C, i.e., lower surface 12M of elastic operation body 12, contacts top 4G of convex surface 4A of movable contact 4. An edge of lower surface 12K under tubular section 12D is placed on step section 11B provided in an entire circumference of side wall 11A of lower case 11.

Push button 13 has columnar section 13A and flange 13B which is provided at its lower end of columnar section 13A and which is provided unitarily with columnar section 13A. Recess 13C is provided in the center of lower surface 13D of flange 13B. Push button 13 contacts upper surface 12L of upper projection 12B, i.e., upper surface 12L of elastic operation body 12, such that an upper part of upper projection 12B of elastic operation body 12 is inserted into recess 13C.

Upper case 14 made of insulating resin upper case 14 has through-hole 14A penetrating through the case. Side wall 14C around through-hole 14A includes step section 14D having a surface facing downward. Upper case 14 is attached to lower case 11 with projection 11C of lower case 11 collapsed, and covers recess 11D of lower case 11.

Push button 13 is inserted into through-hole 14A of upper case 1, and is supported movably in up and down directions. Push button 13 has columnar section 13A protruding upward from through-hole 14A. Upper surface 13F of flange 13B of push button 13 contacts step section 14D of through-hole 14A. In push switch 601, when push button 13 is not activated, push button 13 presses and compresses upper projection 12B of elastic operation body 12 slightly. Elastic operation body 13 urges push button 13 upward and urges flange 13B toward step section 14D, thus preventing push button 13 from wobbling.

As shown in FIG. 2, flange 13B of push button 13 has a track shape provided by cutting a circular shape with two planes 13G in parallel to each other. Portion 14G of through-hole 14A of upper case 14 lower than step section 14D, i.e., closer to lower case 11 than step portion 14D, has a cross section of a track shape according to the track shape of flange 13B. Planes 13G restrict the rotation of push button 13 while push button 13 is pushed, thereby allowing push button 13 to be easily activated.

Before upper case 14 is attached to lower case 11, tubular section 12D of elastic operation body 12 has thickness 12G (FIG. 2) larger than distance 11G from upper surface 11F of side wall 11A surrounding recess 11D of lower case 11 to step section 11B, i.e., distance 11G from upper surface 11F of lower case 11 to an outer periphery of lower surface 14E of upper case 14 arranged to position tubular section 14D between upper surface 11F of lower case 11 and the outer periphery of lower surface 14E of upper case 14. This structure allows tubular section 12D to be held and compressed between step section 11B of lower case 11 and the outer periphery of lower surface 14E of upper case 14 after upper case 14 is attached to lower case 11. Being held, elastic operation body 12 seals recess 11D of lower case 11 from the outside of push switch 601. Recess 11D while being sealed from the outside of push switch 601 accommodates therein movable contact 4 and has inner fixed contact 2A and outer fixed contacts 3A and 3B exposing therein.

Figure 3:
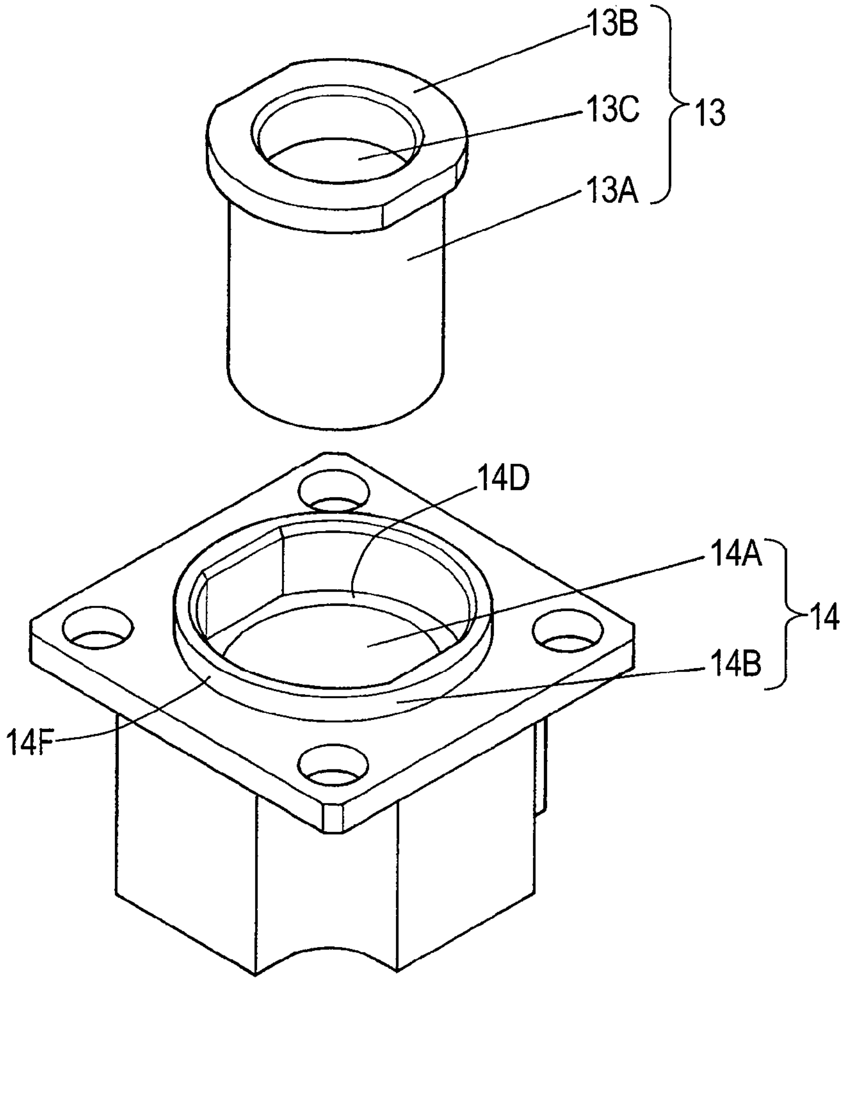
FIG. 3 is a perspective view of an upper case and a push button of the push switch according to the embodiment.

FIG. 3 is a perspective view of push button 13 and upper case 14. Cylindrical projection (tubular projection) 14B is provided at lower end of through-hole 14A of upper case 14. Cylindrical projection 14B has a diameter smaller than that of tubular section 12D of elastic operation body 12, and extends downward. After push switch 601 is assembled, cylindrical projection 14B is located inside tubular section 12D of elastic operation body 12, as shown in FIG. 1. Outer circumference surface 14F of cylindrical projection 14B is located close to inner circumference surface 12H of tubular section 12D such that small gap 12J is provided entirely around outer circumference surface 14F.

Figure 4:
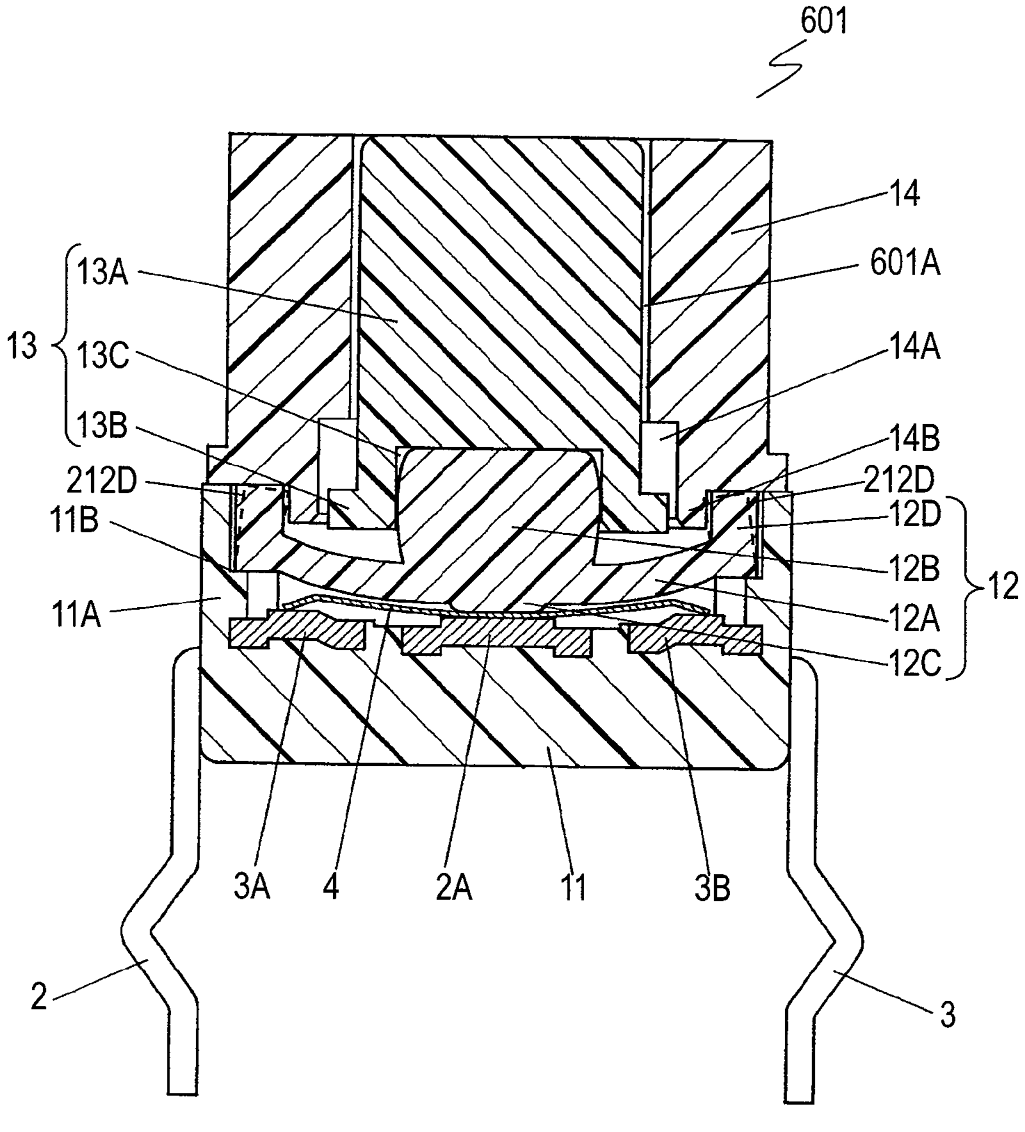
FIG. 4 is a cross-sectional view of the push switch which is activated according to the embodiment.

An operation of push switch 601 will be described below. FIG. 4 is a cross-sectional view of push switch 601 which is activated.

When a pressing force is applied to push button 13 protruding upward from through-hole 14A of upper case 14, push button 13 presses upper projection 12B of elastic operation body 12 inserted into recess 13C of push button 13. Elastic operation body 12 moves downward so that flange section 12A accordingly expands downward to have a bowl shape projecting downward. Elastic body 12 applies a pressure to top 4G of convex surface 4A of movable contact 4 via lower projection 12C. The thickness of flange section 12A is determined such that elastic operation body 12 compressed in a longitudinal direction from upper projection 12B to lower projection 12C.

When the pressing force applied to push button 13 is increased, movable contact 4 having the dome shape is elastically inverted with a click feeling, and has deepest point 4F of concave surface 4B contact inner fixed contact 2A. This operation connects outer fixed contacts 3A and 3B with inner fixed contact 2A via movable contact 4 to connect electrically between terminals 2 and 3, thereby turning on push switch 601.

After movable contact 4 contacts inner fixed contact 2A, the pressing force applied to push button 13 can be further increased to further compress upper projection 12B and lower projection 12C of elastic operation body 12, as shown in FIG. 4, while movable contact 4 continues to contact inner fixed contact 2A.

When the pressing force applied to push button 13 is canceled, the shape of compressed elastic operation body 12 returns to its original shape, and accordingly, push back push button 13 upward. At this moment, an elastic force of movable contact 4 causes the shape of movable contact 4 to return to the original dome shape by its self restoration with a click feeling, thereby removing deepest point 4F of concave surface 4B from inner fixed contact 2A. Outer fixed contact 3A is accordingly disconnected electrically from outer fixed contact 3B, thereby turning off push switch 601, as shown in FIG. 1.

In order to move push button 13 in the up and down directions in through-hole 14A of upper case 14, gap 601A is necessarily provided between push button 13 and upper case 14. Dust existing at the outside of switch 601 may pass gap 601A to reach upper surface 12F of flange section 12A of elastic operation body 12.

However, the dust entering into gap 601A cannot enter into recess 11D since flange section 12A of elastic operation body 12 seals recess 11D of lower case 11. That is, while flange section 12A expands and contracts during the pressing of push button 13, tubular section 12D is compressed, and flange section 12A and tubular section 12D securely seal recess 11D. This prevents movable contact 4 from having a contact failure with fixed contacts 2A, 3A, and 3B due to the dust. Even if dust reaches upper surface 12F of flange section 12A, tubular section 12D protruding upward from upper surface 12F of flange section 12A restricts the movement of the dust and prevents the dust from entering into recess 11D.

Outer circumference surface 14F of cylindrical projection 14B extending downward from the periphery of through-hole 14A of upper case 14 is close to inner circumference surface 12H of tubular section 12D of elastic operation body 12 by small gap 12J between surfaces 14F and 12H. Gap 12J restricts the upward movement of the dust reaching upper surface 12F of flange section 12A, thereby preventing the dust from reaching an upper surface of tubular section 12D. When push button 13 is pressed, flange section 12A expands and contracts to generate a force which pushes tubular section 12D towards the center of elastic operation body 12. Inner circumference surface 12H of tubular section 12D is located close to outer circumference surface 14F of cylindrical projection 14B of upper case 14. Cylindrical projection 14B hence prevents tubular section 12D from being pushed towards the center of elastic operation body 12. That is, when push button 13 is pressed, tubular section 12D of elastic operation body 12 deforms to become tubular section 212D denoted by the broken line of FIG. 4. Cylindrical projection 14B of upper case 14 contacts tubular section 212D (12D) which deforms, thereby preventing tubular section 212D (12D) from further deforming. A gap is not produced between tubular section 12D and upper case 14 or between tubular section 12D and lower case 11 even when push button 13 is pressed. Accordingly, recess 11D is continuously sealed securely to prevent a contact failure between movable contact 4 and fixed contacts 2A, 3A, and 3B.

Figure 5:
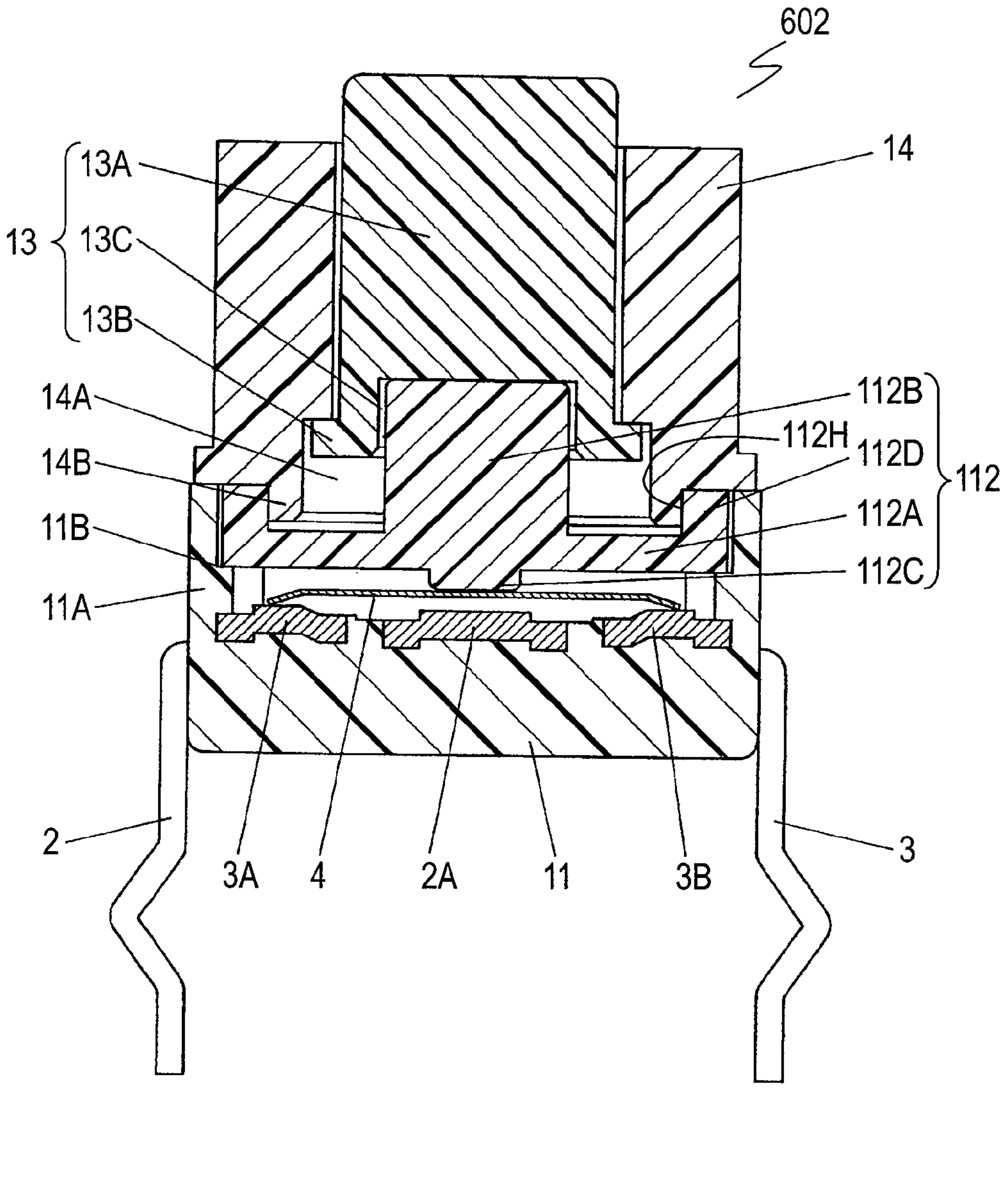
FIG. 5 is a cross-sectional view of another push switch according to the embodiment.
Figure 6:
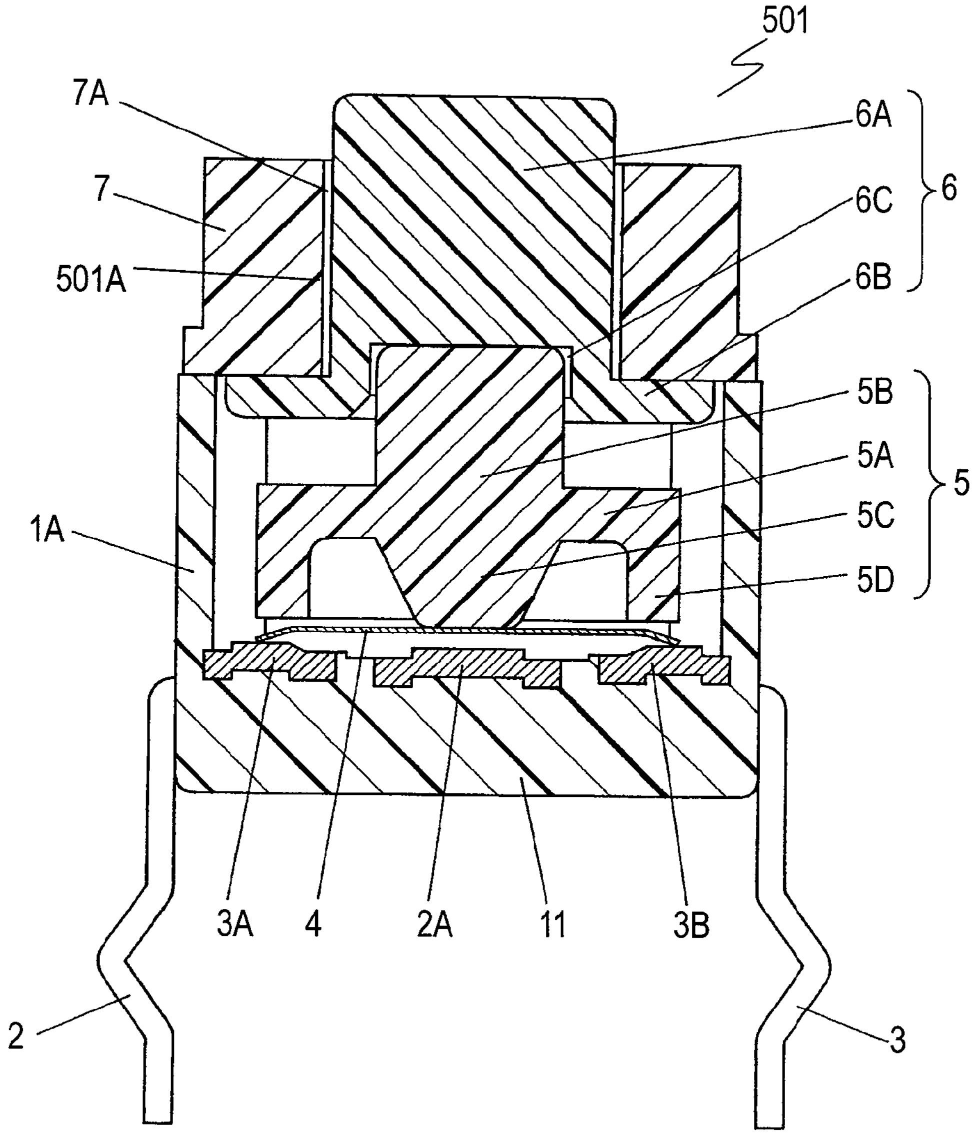
Fig. 6 PRIOR ART
FIG. 6 is a cross-sectional view of a conventional push switch.
Figure 7:
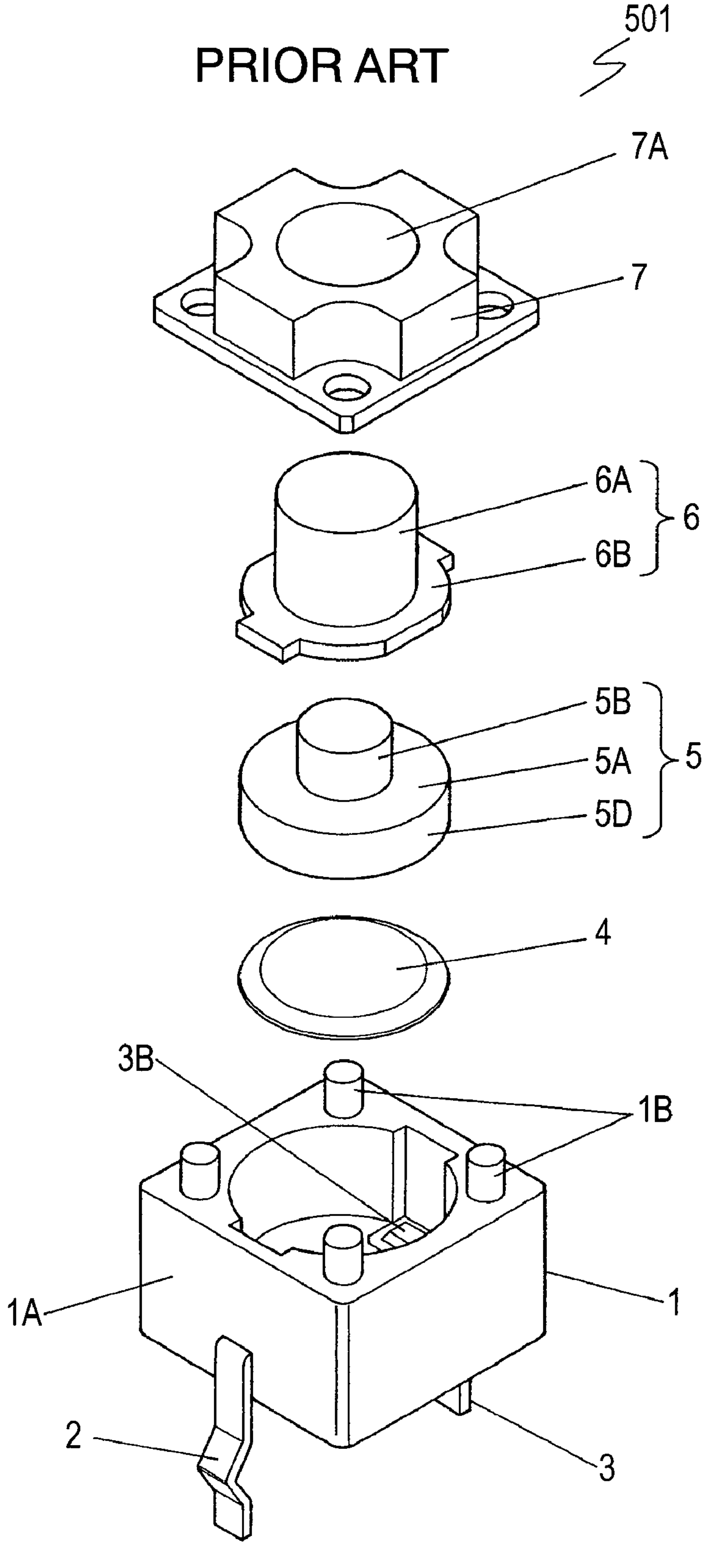
FIG. 7 is an exploded perspective view of the conventional push switch.
Figure 8:
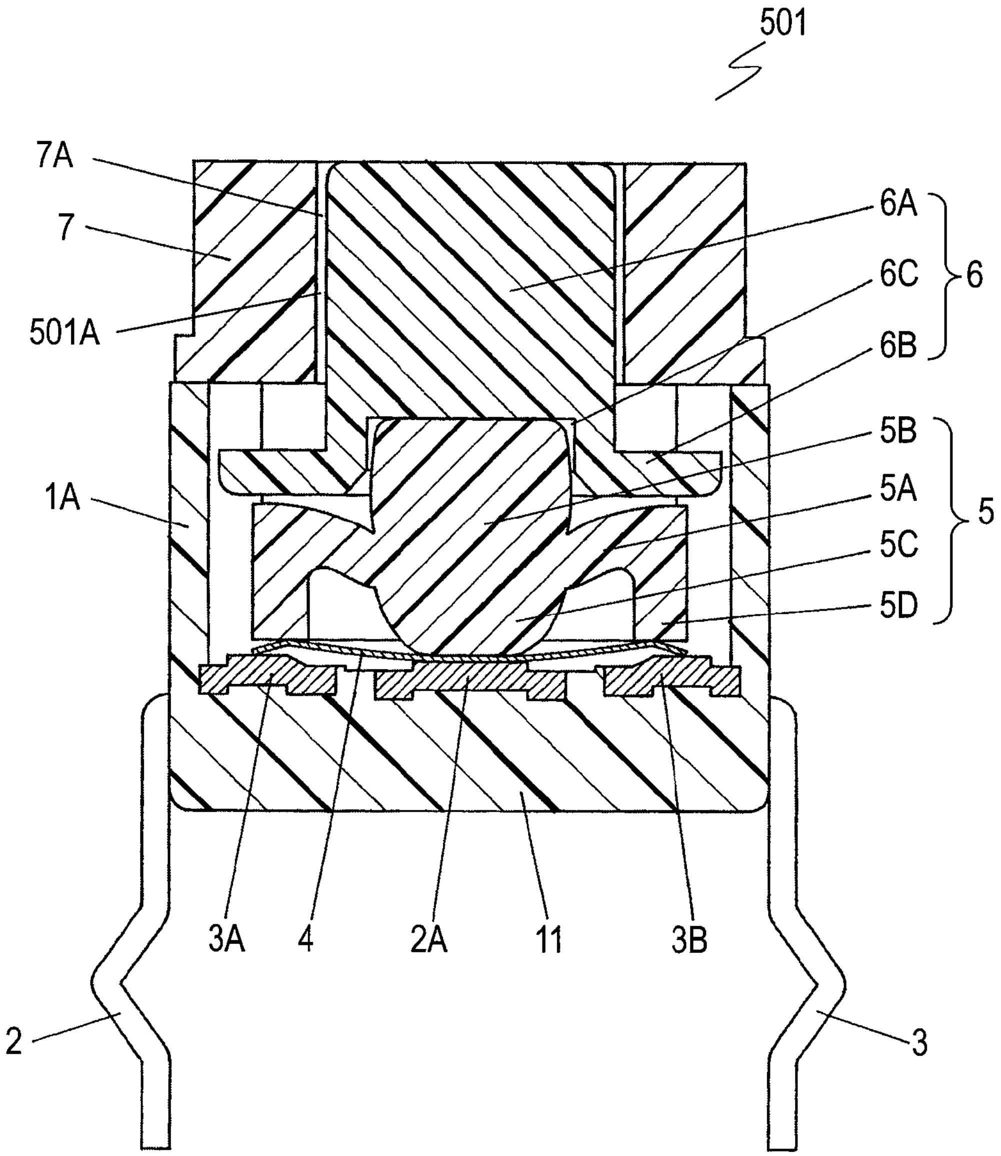
Fig. 8 PRIOR ART
FIG. 8 is a cross-sectional view of the conventional push switch which is activated.

FIG. 5 is a cross-sectional view of another push switch 602 according to the embodiment. In FIG. 5, the same components as those shown in FIG. 1 are denoted by the same reference numerals, and their description will be omitted. Push switch 602 includes elastic operation body 112 instead of elastic operation body 12 of push switch 601. Elastic operation body 112 has flange section 112A, upper projection 112B, lower projection 112C, and tubular section 112D which have the same shapes as those of flange section 12A, upper projection 12B, lower projection 12C, and tubular section 12D of elastic operation body 12 shown in FIG. 1, respectively. Outer circumference surface 14F of cylindrical projection 14B of upper case 14 contacts inner circumference surface 112H of tubular section 112D of elastic operation body 112. This structure securely prevent tubular section 112D from being pushed towards the center when push button 13 is pressed. However, this structure may prevent upper case 14 from being assembled easily to elastic operation body 112. Thus, gap 12J having a size determined appropriately, as shown in FIG. 1, is preferably provided between upper case 14 and elastic operation body 12.

The length of cylindrical projection 14B of upper case 14 is preferably determined, such that the lower end of cylindrical projection 14B contacts upper surface 12F of flange section 12A of elastic operation body 12. That is, the length may be the same as the height from upper surface 12F of flange section 12A of tubular section 12D. Cylindrical projection 14B may have this length preferably in dust resistance in preventing tubular section 112D from being pushed towards the center. This length is preferably determined to be an appropriate value in consideration of an easy assembly of switch 601.

What is claimed is:

1. A push switch comprising:

a lower case made of insulating resin, the lower case having a recess provided therein, the recess of the lower case having a bottom;

an inner fixed contact exposing from the bottom of the recess of the lower case;

an outer fixed contact exposing from the bottom of the recess of the lower case;

a movable contact accommodated in the recess, the movable contact being made of a metal plate having a dome shape, the dome shape having a concave surface, a convex surface opposite to the concave surface, and an outer peripheral end, the concave surface of the dome shape facing the inner fixed contact by a distance between the concave surface and the inner fixed contact, the outer peripheral end being placed on the outer fixed contact;

an upper case attached to the lower case, the upper case having a through-hole located above the recess of the lower case;

an elastic operation body for sealing the recess of the lower case, the elastic operation body having a lower surface, an upper surface opposite to the lower surface, and an outer edge, the lower surface of the elastic operation body contacting the convex surface of the movable contact, the outer edge held between the upper case and the lower case while being compressed, wherein the elastic operation body includes a flange section having the outer edge, and a tubular section protruding from the outer edge of the flange section towards the upper case, the tubular section having an inner circumference surface; and a push button provided on the upper surface of the elastic operation body, the push button being inserted into the through-hole of the upper case movably.

2. The push switch according to claim 1, wherein the upper case includes a tubular projection extending from a periphery of the through-hole towards the flange section of the elastic operation body, the tubular projection having an outer circumference surface facing the inner circumference surface of the tubular section of the elastic operation body by a gap between the outer circumference surface of the tubular projection and the inner circumference surface of the tubular section of the elastic operation body.

3. The push switch according to claim 1, wherein the upper case includes a tubular projection extending from a periphery of the through-hole towards the flange section of the elastic operation body, the tubular projection having an outer circumference surface contacting the inner circumference surface of the tubular section of the elastic operation body.

4. A push switch according to claim 1, wherein said upper case includes a downward projecting cylindrical projection, said tubular section makes contact with said downward projecting cylindrical projection upon being deflected towards a center of said elastic operation body.

* * * * *